(12) United States Patent
Ma et al.

(10) Patent No.: US 11,902,077 B2
(45) Date of Patent: Feb. 13, 2024

(54) FREQUENCY DIVISION MULTIPLE ACCESS COMMUNICATION METHOD BASED ON HARMONIC MODULATION TECHNOLOGY

(71) Applicant: Guangdong University of Technology, Guangzhou (CN)

(72) Inventors: Jianguo Ma, Guangzhou (CN); Shaohua Zhou, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 292 days.

(21) Appl. No.: 17/365,039

(22) Filed: Jul. 1, 2021

(65) Prior Publication Data

US 2021/0328851 A1  Oct. 21, 2021

Related U.S. Application Data

(63) Continuation of application No. PCT/CN2020/113126, filed on Sep. 3, 2020.

(30) Foreign Application Priority Data

Dec. 13, 2019  (CN) .......................... 201911279176.4

(51) Int. Cl.
  *H04L 27/28*   (2006.01)
  *H04L 5/00*    (2006.01)
  *H04L 5/14*    (2006.01)
(52) U.S. Cl.
  CPC ............ *H04L 27/28* (2013.01); *H04L 5/0046* (2013.01); *H04L 5/0048* (2013.01); *H04L 5/14* (2013.01)
(58) Field of Classification Search
  CPC ...................................................... H04L 27/28
  See application file for complete search history.

(56) References Cited

U.S. PATENT DOCUMENTS

2011/0222526 A1*  9/2011  Alamouti .............. H04L 5/1484
                                                                  370/347
2016/0285505 A1    9/2016  Lee et al.

FOREIGN PATENT DOCUMENTS

CN         103312487 A    9/2013
CN         109068348 A   12/2018
                (Continued)

OTHER PUBLICATIONS

International Search Report for the corresponding PCT application No. PCT/CN2020/113126, dated Nov. 27, 2020, 5 pages total.

*Primary Examiner* — Abdeltif Ajid
(74) *Attorney, Agent, or Firm* — Yong Chen

(57) ABSTRACT

A method is disclosed that divide a total frequency band of a communication system into several equally spaced non-overlapping information channels, which are allocated to different users; the information channels are in one-to-one correspondence with the users; user signals from different addresses are distinguished based on frequency, thereby completing the multiple access connection; and duplex communication between two users uses a fundamental frequency and harmonics for information transmission. A process of the information transmission is as follows: different information is first modulated and then is separately loaded on different harmonic components, different information is transmitted through different harmonic components or component combinations so that each pair of information channels can transmit N groups of different information at the same time, and finally the fundamental frequency and harmonic information received by a receiving end is demodulated to obtain all the transmitted information.

4 Claims, 2 Drawing Sheets

MSC: Mobile Switching Center

(56) References Cited

FOREIGN PATENT DOCUMENTS

| | | |
|---|---|---|
| CN | 110235384 A | 9/2019 |
| CN | 111030777 | 4/2020 |
| CN | 111132334 | 5/2020 |
| CN | 111163024 A | 5/2020 |
| WO | WO-2018179010 A1 * | 10/2018 |
| WO | WO-2019016771 A1 * | 1/2019 |

* cited by examiner

FREQUENCY DIVISION MULTIPLE ACCESS COMMUNICATION METHOD BASED ON HARMONIC MODULATION TECHNOLOGY

CROSS-REFERENCE TO RELATED APPLICATION

The application is a continuation of International Application No. PCT/CN2020/113126, filed on Sep. 3, 2020, which claims priority to and benefit of Chinese Patent Application No. 201911279176.4, filed on Dec. 13, 2019, and entitled "Frequency Division Multiple Address Communication Method Based on Harmonic Modulation Technology". Both of the above-referenced applications are incorporated into the present application by reference herein in their entirety.

TECHNICAL FIELD

The present disclosure relates to the technical field of communications, and in particular, to a frequency division multiple access communication method based on harmonic modulation technology.

TECHNICAL BACKGROUND

People know that an automobile running on the road needs to occupy a certain lane. Generally, there are more vehicles running on a wide road, and there will be more corresponding lanes. The road is usually divided into 4 lanes, 6 lanes or 8 lanes. Then, in the same way, for "lane" occupied during signal transmission, people call it a frequency spectrum. If a road is contracted by local tyrants and used for marriage, then its road will be occupied. Especially when leaders of various countries come for meetings, the roads will be occupied. In the same way, if you are making a call, a corresponding frequency spectrum will be occupied by you when you call. Then, the more frequency spectrum you occupy, the less the corresponding frequency spectrum can be used by others. The spectrum you occupy is called a bandwidth. If the total bandwidth is relatively large and one person occupies less frequency spectrum when calling, then more people can be allowed to call at the same time. Therefore, it can be understood that one of the key issues to be solved urgently in communications is how to fully improve the utilization rate of frequency spectrum under limited frequency spectrum resources.

However, the conventional frequency division multiple access communication method divides the transmission frequency band into several narrow and non-overlapping sub-bands. Each user is assigned one fixed sub-band, and signals are modulated to the sub-band so as to transmit information to the corresponding user. There should be enough space between respective sub-bands to prevent interference. Hence, it can be seen that in the conventional frequency division multiple access communication method, first, only the fundamental frequency ($f_0$) is used to transmit information, and no harmonics are used to transmit information; and second, there should be enough space between respective sub-bands to prevent interference. In this way, a great waste of frequency spectrum resources will be caused. It is foreseeable that in the 5G era, mobile data traffic will show an explosive growth, and the amount of frequency spectrum required will also far exceed the sum of previous generations of mobile communication technologies. The contradiction between frequency spectrum supply and demand will become more prominent in the 5G era. Therefore, how to improve the frequency spectrum utilization of the conventional frequency division multiple access communication method has become an urgent need in the current 5G era.

SUMMARY

An objective of the present disclosure is to overcome the shortcomings of the prior art and provide a frequency division multiple access communication method based on harmonic modulation technology with high frequency spectrum utilization.

In order to achieve the above objective, the technical solution provided by the present disclosure is as follows:

A frequency division multiple access communication method based on harmonic modulation technology, wherein a total frequency band of a communication system is divided into several equally spaced non-overlapping information channels, which are allocated to different users; the information channels are in one-to-one correspondence with the users; user signals from different addresses are distinguished based on frequency, thereby completing a multiple access connection; and duplex communication between two users uses a fundamental frequency and harmonics for information transmission, realizing use of a pair of frequency channels to communicate with different users at the same time.

Further, a process of the information transmission is as follows: different information is first modulated and then is separately loaded on different harmonic components, different information is transmitted through different harmonic components so that each pair of information channels can transmit N groups of different information at the same time, and finally the fundamental frequency and harmonic information received by a receiving end is demodulated to obtain all the transmitted information.

Further, before the information transmission, a fixed harmonic mode is stored in advance and a given harmonic component is used to calculate all different signals, thereby demodulating a desired signal from other signals.

Further, based on the fixed harmonic mode stored in advance, the given harmonic component is used to calculate all two different signals, so that a specific process of demodulating the desired signal from other signals is as follows:

assuming that all harmonic modes are known:

$$V_{out} = a_0 f_0 + a_2 f_2 + a_3 f_3 + a_4 f_4 + a_5 f_5 + \ldots + a_n f_m \quad (1)$$

where $a_n$ represents a n-th harmonic coefficient, n=0, 2, 3, 4, . . . ; $f_0$ represents the fundamental frequency; $f_m$ represents a m-th harmonic component, and m=2, 3, 4, . . . ;

At this time, both a first signal and a second signal are loaded on even and odd harmonics for transmission, respectively, and the following can be obtained:

$$V_{out}^\beta = a_0^\beta f_0 + a_2^\beta f_2 + a_4^\beta f_4 + a_6^\beta f_6 + a_8^\beta f_8 + \ldots \quad (2)$$

$$V_{out}^\gamma = a_0^\gamma f_0 + a_3^\gamma f_3 + a_5^\gamma f_5 + a_7^\gamma f_7 + a_9^\gamma f_9 + \ldots \quad (3)$$

Finally, a mixed signal of the first signal and the second signal received simultaneously at the signal receiving end is:

$$V_{out} = a_0^\gamma f_0 + a_0^\beta f_0 + a_2^\beta f_2 + a_3^\gamma f_3 + a_4^\beta f_4 + a_5^\gamma f_5 + a_6^\beta f_6 + a_7^\gamma f_7 + a_8^\beta f_8 + a_9^\gamma f_9 + \ldots \quad (4)$$

It can be known from (1) and (4) that:

$$a_0^\gamma f_0 + a_0^\beta f_0 = a_0 f_0 \quad (5)$$

$$a_2^\beta f_2 = a_2 f_2;\ a_4^\beta f_4 = a_4 f_4;\ a_6^\beta f_6 = a_6 f_6;\ a_8^\beta f_8 = a_8 f_8;\ \ldots \quad (6)$$

$$a_3^\gamma f_3 = a_3 f_3;\ a_5^\gamma f_5 = a_5 f_5;\ a_7^\gamma f_7 = a_7 f_7;\ a_9^\gamma f_9 = a_9 f_9;\ \ldots \quad (7)$$

Since the fundamental frequency used when transmitting the first signal and the second signal is the same, only the harmonic components are different, and it can be known from (5) that:

$$a_0{}^v f_0 = a_0{}^p f_0 = \tfrac{1}{2} a_0 f_0 \qquad (8)$$

Therefore, according to formulas (6)-(8), the receiving end can demodulate both the first signal and the second signal.

Further, when the different information is modulated and then is separately loaded on different harmonic components for information transmission, different combinations of harmonic components may further be selected for transmission of signals as needed.

Compared with the prior art, the principle and advantages of the present solution are as follows:
The present solution uses harmonic modulation technology to load the signals to be transmitted on different harmonic components or component combinations, and transmit different information through different harmonic components or component combinations, so that each pair of information channels can simultaneously transmit N Group different information, realizing the use of a pair of information channels to communicate with different users at the same time. Moreover, the communication between users does not interfere with each other, thereby greatly improving the utilization of existing frequency spectrum resources and alleviating the tension of frequency spectrum resources.

BRIEF DESCRIPTION OF THE DRAWINGS

In order to more clearly illustrate the technical solutions in embodiments of the present disclosure or the prior art, the measures that need to be used in the description of the embodiments or the prior art will be briefly described below. Obviously, the drawings in the following description are only some embodiments of the present disclosure, and other drawings can be obtained by those of ordinary skill in the art from these without creative efforts.

DETAILED DESCRIPTION

Figure 1:
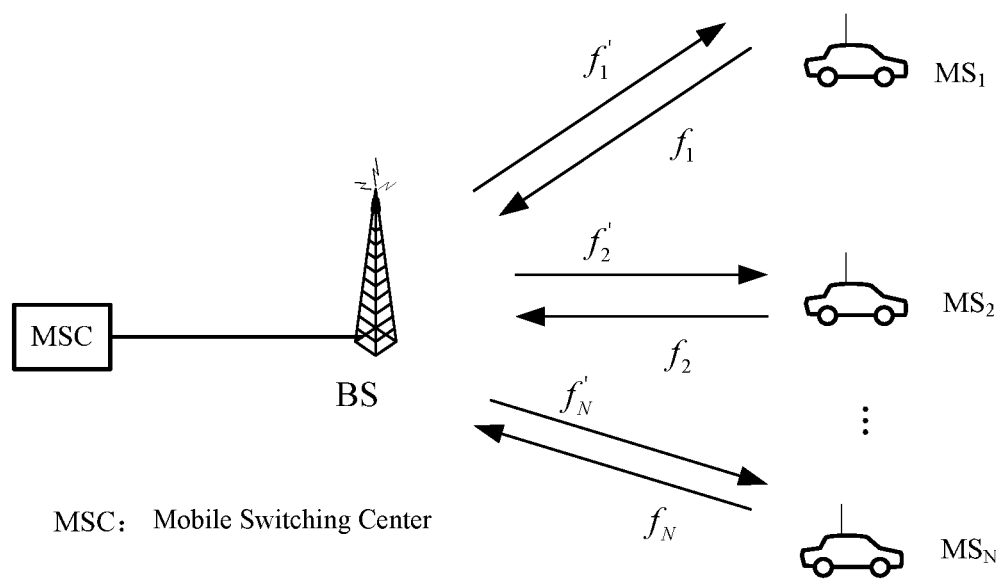
FIG. 1 is a schematic diagram of a working principle of the conventional frequency division multiple access communication method.

The present disclosure will be further described below in conjunction with a conventional frequency division multiple access communication method and a specific embodiment of the present disclosure:

The conventional frequency division multiple access communication method assigns a specific information channel to each user, and these information channels are allocated to users requesting services as required. During the entire call, other users cannot share this frequency band. It can be seen from FIG. 1 that in a Frequency Division Duplex (FDD) system, one information channel, i.e., a pair of frequency channels, is allocated to a user. One frequency channel is used as a forward (downlink) information channel, i.e. an information channel from a base station (BS) to a mobile station (MS); the other is used as a reverse (uplink) information channel, i.e. an information channel from the mobile station to the base station. The base station of this communication system must transmit and receive multiple signals of different frequencies at the same time; and communication between any two mobile users must be relayed through the base station, and thus 2 information channels (1 pair of frequency channels) must be occupied at the same time to achieve duplex communication. Since a pair of frequency channels can only communicate with one user, it causes a waste of frequency spectrum resources.

However, think about the natural communication between humans. For 7 billion people, its frequency bandwidth is only 20 Hz-20 kHz! Noise, animals, wind, trees and other natural sounds only occupy this bandwidth. However, the humans can easily identify them. For example, in a concert, many different instruments play the same melody, but the people can identify each instrument. The reason is that every instrument is playing the same pitch (the same fundamental frequency), but the modes of the harmonics are different. This shows that, in fact, harmonics can also carry information, and not only the fundamental frequency currently in common use can carry information.

Figure 2:
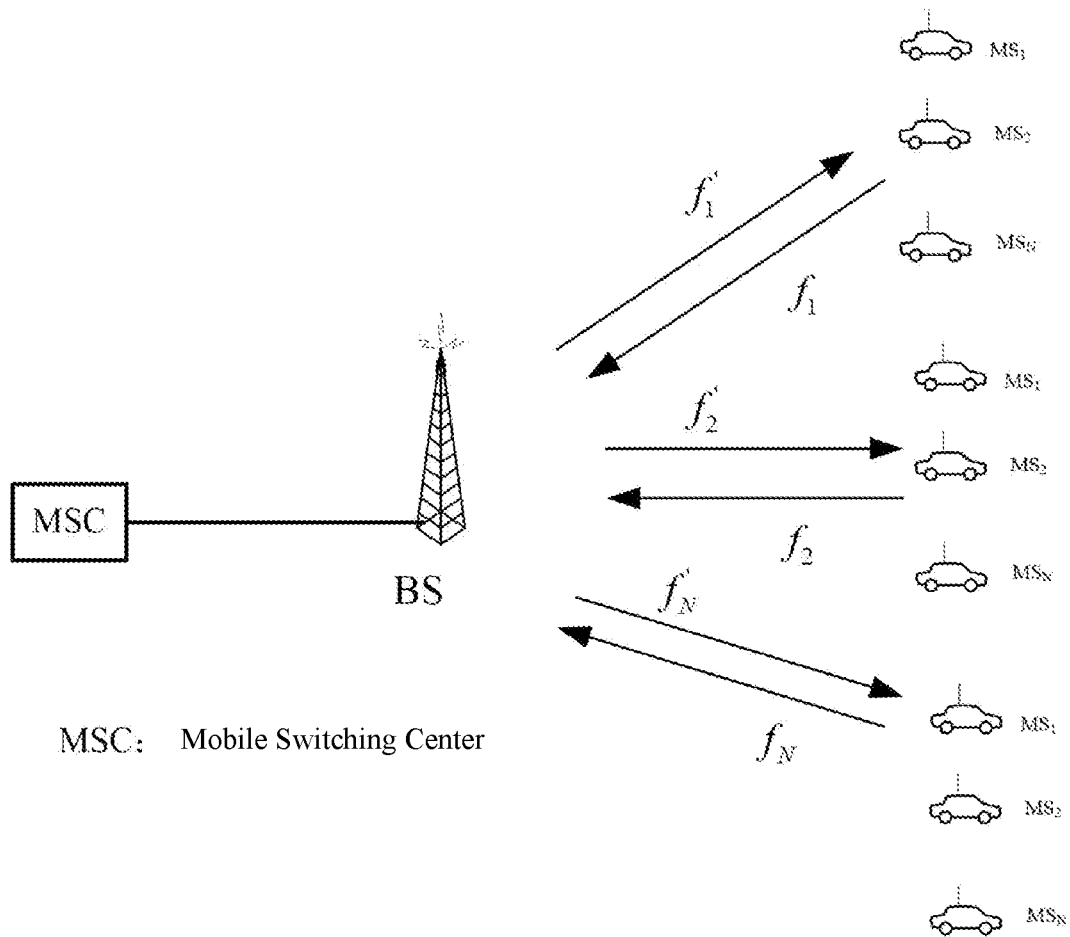
FIG. 2 is a working schematic diagram of a frequency division multiple access communication method based on harmonic modulation technology.

Based on this, as shown in FIG. 2, the present embodiment sets forth a frequency division multiple access communication method based on a harmonic modulation technology, which is specifically as follows:

A total frequency band of a communication system is divided into several equally spaced non-overlapping information channels, which are allocated to different users; the information channels are in one-to-one correspondence with the users; user signals from different addresses are distinguished based on frequency, thereby completing a multiple access connection; and duplex communication between two users uses a fundamental frequency and harmonics for information transmission, realizing the use of a pair of frequency channels to communicate with different users at the same time.

Specifically, a process of the information transmission is as follows:
Different information is first modulated and then is separately loaded on different harmonic components, different information is transmitted through different harmonic components so that each pair of information channels can transmit N groups of different information at the same time, and finally the fundamental frequency and harmonic information received by a receiving end is demodulated to obtain all the transmitted information.

Figure 3:
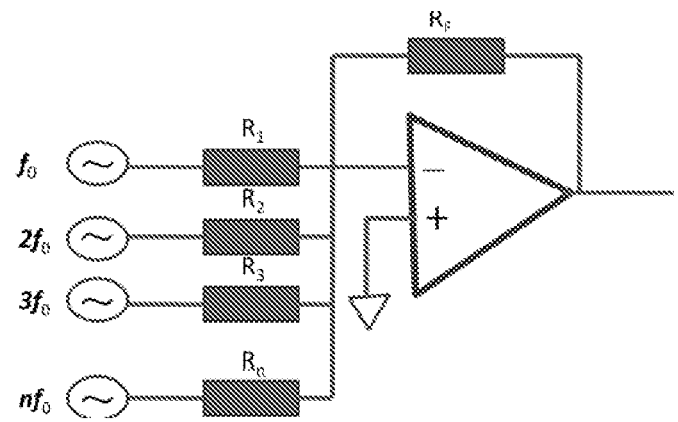
FIG. 3 is a harmonic modulation circuit diagram.

Herein, a harmonic modulation circuit is as shown in FIG. 3. An output of the harmonic modulation circuit is a sum of all input voltages. For inputs with the same fundamental frequency and different harmonic components, their outputs are different. Before the information transmission, a fixed harmonic mode needs to be stored in advance so that a given harmonic component can be used to calculate all different signals, thereby demodulating a desired signal from other signals.

For a better understanding, it is assumed that all harmonic modes are known (two signals need to be calculated):

$$V_{out} = a_0 f_0 + a_2 f_2 + a_3 f_3 + a_4 f_4 + a_5 f_5 + \ldots + a_n f_m \qquad (1)$$

where $a_n$ represents a n-th harmonic coefficient, n=0, 2, 3, 4, . . . ; $f_0$ represents the fundamental frequency; $f_m$ represents a m-th harmonic component, and m=2, 3, 4, . . . ;

At this time, both a first signal and a second signal are loaded on even and odd harmonics for transmission, respectively, and the following can be obtained:

$$V_{out}{}^p = a_0{}^p f_0 + a_2{}^p f_2 + a_4{}^p f_4 + a_6{}^p f_6 + a_8{}^p f_8 + \ldots \qquad (2)$$

$$V_{out}{}^v = a_0{}^v f_0 + a_3{}^v f_3 + a_5{}^v f_5 + a_7{}^v f_7 + a_9{}^v f_9 + \ldots \qquad (3)$$

Finally, a mixed signal of the first signal and the second signal received simultaneously at the signal receiving end is:

$$V_{out}=a_0^vf_0+a_0^pf_0+a_2^pf_2+a_3^vf_3+a_4^pf_4+a_5^vf_5+a_6^pf_6+a_7^vf_7+a_8^pf_8+a_9^vf_9+\ldots \quad (4)$$

It can be known from (1) and (4) that:

$$a_0^vf_0+a_0^pf_0=a_0f_0 \quad (5)$$

$$a_2^pf_2=a_2f_2;\ a_4^pf_4=a_4f_4;\ a_6^pf_6=a_6f_6;\ a_8^pf_8=a_8f_8;\ \ldots \quad (6)$$

$$a_3^vf_3=a_3f_3;\ a_5^vf_5=a_5f_5;\ a_7^vf_7=a_7f_7;\ a_9^vf_9=a_9f_9;\ \ldots \quad (7)$$

Since the fundamental frequency used when transmitting the first signal and the second signal is the same, only the harmonic components are different, and it can be known from (5) that:

$$a_0^vf_0=a_0^pf_0=\tfrac{1}{2}a_0f_0 \quad (8)$$

Therefore, according to formulas (6)-(8), the receiving end can demodulate both the first signal and the second signal.

In addition to the above, different combinations can be used to transmit the first signal and the second signal. For example, the first signal is loaded with the second and third harmonic components, and the second signal is loaded with the fourth harmonic component. When in actual use, different harmonic component combinations can be selected for transmitting the signals as needed.

In this embodiment, the harmonic modulation technology is mainly used to perform harmonic modulation on each pair of frequency channels (such as $f_1$ and $f'_1$), and the information to be transmitted is separately loaded on different harmonic components or component combinations, so that each pair of frequency channels can simultaneously transmit N Group different information. In this way, each pair of frequency channels may be used to simultaneously realize communication with N users without interference with each other, thereby greatly improving the utilization of existing frequency spectrum resources and alleviating the tension of frequency spectrum resources.

The embodiments described above are only preferred embodiments of the present disclosure, and do not limit the scope of implementation of the present disclosure. Therefore, any changes made according to the shape and principle of the present disclosure should be covered by the scope of protection of the present disclosure.

What is claimed is:

1. A frequency division multiple access communication method based on harmonic modulation technology, wherein a total frequency band of a communication system is divided into several equally spaced non-overlapping information channels, which are allocated to different users; the information channels are in one-to-one correspondence with the users; user signals from different addresses are distinguished based on frequency, thereby completing a multiple access connection; and duplex communication between two users uses a fundamental frequency and harmonics for information transmission, realizing use of a pair of frequency channels to communicate with different users at the same time;

wherein a process of the information transmission is as follows: different information is first modulated and then is separately loaded on different harmonic components, different information is transmitted through different harmonic components so that each pair of information channels can transmit N group of different information at same time, and finally the fundamental frequency and harmonic information received by a receiving end is demodulated to obtain all the transmitted information.

2. The frequency division multiple access communication method based on the harmonic modulation technology according to claim 1, wherein before the information transmission, a fixed harmonic mode is stored in advance and a given harmonic component is used to calculate all different signals, thereby demodulating a desired signal from other signals.

3. The frequency division multiple access communication method based on the harmonic modulation technology according to claim 2, wherein based on the fixed harmonic mode stored in advance, the given harmonic component is used to calculate all two different signals, so that a specific process of demodulating the desired signal from other signals is as follows:

assuming that all harmonic modes are known:

$$V_{out}=a_0f_0+a_2f_2+a_3f_3+a_4f_4+a_5f_5+\ldots+a_nf_m \quad (1)$$

where $a_n$ represents a n-th harmonic coefficient, n=0, 2, 3, 4, . . . ; $f_0$ represents the fundamental frequency; $f_m$ represents a m-th harmonic component, and m=2, 3, 4, . . . ;

at this time, both a first signal and a second signal are loaded on even and odd harmonics for transmission, respectively, and the following can be obtained:

$$V_{out}^p=a_0^pf_0+a_2^pf_2+a_4^pf_4+a_6^pf_6+a_8^pf_8+\ldots \quad (2)$$

$$V_{out}^v=a_0^vf_0+a_3^vf_3+a_5^vf_5+a_7^vf_7+a_9^vf_9+\ldots \quad (3)$$

finally, a mixed signal of the first signal and the second signal received simultaneously at the signal receiving end is:

$$V_{out}=a_0^vf_0+a_0^pf_0+a_2^pf_2+a_3^vf_3+a_4^pf_4+a_5^vf_5+a_6^pf_6+a_7^vf_7+a_8^pf_8+a_9^vf_9+\ldots \quad (4)$$

it can be known from (1) and (4) that:

$$a_0^vf_0+a_0^pf_0=a_0f_0 \quad (5)$$

$$a_2^pf_2=a_2f_2;\ a_4^pf_4=a_4f_4;\ a_6^pf_6=a_6f_6;\ a_8^pf_8=a_8f_8;\ \ldots \quad (6)$$

$$a_3^vf_3=a_3f_3;\ a_5^vf_5=a_5f_5;\ a_7^vf_7=a_7f_7;\ a_9^vf_9=a_9f_9;\ \ldots \quad (7)$$

since the fundamental frequency used when transmitting the first signal and the second signal is the same, only the harmonic components are different, and it can be known from (5) that:

$$a_0^vf_0=a_0^pf_0=\tfrac{1}{2}a_0f_0 \quad (8)$$

therefore, according to formulas (6)-(8), the receiving end can demodulate both the first signal and the second signal.

4. The frequency division multiple access communication method based on the harmonic modulation technology according to claim 1, wherein when the different information is modulated and then is separately loaded on different harmonic components for information transmission, different combinations of harmonic components may further be selected for transmission of signals as needed.

* * * * *